(12) United States Patent
Yamaji

(10) Patent No.: US 11,538,245 B2
(45) Date of Patent: Dec. 27, 2022

(54) MOVING AND STILL IMAGE METHOD, DEVICE, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/841,393

(22) Filed: Apr. 6, 2020

(65) Prior Publication Data

US 2020/0234053 A1    Jul. 23, 2020

Related U.S. Application Data

(62) Division of application No. 15/874,420, filed on Jan. 18, 2018, now Pat. No. 10,650,243, which is a
(Continued)

(30) Foreign Application Priority Data

May 27, 2015    (JP) .................................. 2015-107009

(51) Int. Cl.
*G06V 20/40* (2022.01)
*G06V 40/10* (2022.01)
*G06V 40/16* (2022.01)

(52) U.S. Cl.
CPC .............. *G06V 20/46* (2022.01); *G06V 40/10* (2022.01); *G06V 40/16* (2022.01)

(58) Field of Classification Search
CPC ... G01S 13/931; G01S 7/4873; G06K 9/3241; G06K 9/00221; G06K 9/00362;
(Continued)

(56) References Cited

U.S. PATENT DOCUMENTS 7,231,144 B2    6/2007    Tanaka et al.
9,858,485 B2    1/2018    Yamaji
(Continued)

FOREIGN PATENT DOCUMENTS

JP    2008294513 A    12/2008
JP    2010093405 A    4/2010
(Continued)

OTHER PUBLICATIONS

An Office Action; "Notification of Reasons for Refusal," mailed by the Japanese Patent Office dated May 8, 2018, which corresponds to Japanese Patent Application No. 2015-107009 and is related to U.S. Appl. No. 15/874,420; with English language translation.

*Primary Examiner* — Kenny A Cese
(74) *Attorney, Agent, or Firm* — Studebaker & Brackett PC

(57) ABSTRACT

In the image processing device, the method and the recording medium according to the present invention, the characteristic information extractor extracts the number of times the same subject appears in the still images. The target object detector detects the target subject which appears the number of times not less than the threshold value. The image analysis condition determiner sets the image analysis condition for the portion of the moving image where the target subject is absent to be rougher than that where the target subject is present. The frame image analyzer extracts frame images from the moving image in accordance with the image analysis condition. The frame image output section calculates the evaluation value of the frame images based on the result of the image analysis and output the frame image having the evaluation value not less than the threshold value.

14 Claims, 6 Drawing Sheets

Related U.S. Application Data division of application No. 15/150,452, filed on May 10, 2016, now Pat. No. 9,911,047.

(58) Field of Classification Search
CPC ............ G06K 9/00744; G06K 9/00751; G06T 7/149; G06T 2207/10016; G06T 2207/30196; G06T 2207/30232; G06T 2207/30241; G06V 20/46; G06V 40/10; G06V 40/16
See application file for complete search history.

(56) References Cited

U.S. PATENT DOCUMENTS

| | | |
|---|---|---|
| 2003/0219146 A1 | 11/2003 | Jepson et al. |
| 2005/0001933 A1 | 1/2005 | Yoshikawa et al. |
| 2005/0140813 A1 | 6/2005 | Wani |
| 2006/0204044 A1 | 9/2006 | Takemoto et al. |
| 2006/0213386 A1 | 9/2006 | Funakura |
| 2008/0247600 A1* | 10/2008 | Date ............... G11B 27/329 707/E17.02 |
| 2009/0069952 A1 | 3/2009 | Kikuchi |
| 2009/0244625 A1 | 10/2009 | Hasegawa et al. |
| 2009/0249177 A1 | 10/2009 | Yamaji et al. |
| 2009/0316009 A1 | 12/2009 | Ito et al. |
| 2010/0073488 A1 | 3/2010 | Murase |
| 2010/0103077 A1* | 4/2010 | Sugiyama .......... G02B 27/0172 345/8 |
| 2010/0321505 A1 | 12/2010 | Kokubun |
| 2012/0008915 A1* | 1/2012 | Takahashi ............. G11B 27/28 386/E5.003 |
| 2012/0020648 A1 | 1/2012 | Yamaji |
| 2012/0134541 A1 | 5/2012 | Hara |
| 2014/0056539 A1 | 2/2014 | Kashiwa et al. |
| 2014/0086496 A1* | 3/2014 | Yoshida ............... G06K 9/6215 382/220 |
| 2014/0211997 A1 | 7/2014 | Kokubun |
| 2014/0240479 A1 | 8/2014 | Yasukawa et al. |
| 2014/0285428 A1* | 9/2014 | Holz ..................... G06F 3/005 345/156 |
| 2015/0130823 A1 | 5/2015 | Kim et al. |
| 2015/0302338 A1 | 10/2015 | Zaveri |
| 2016/0187653 A1 | 6/2016 | Kimura |
| 2016/0350616 A1 | 12/2016 | Yamaji |

FOREIGN PATENT DOCUMENTS

| | | |
|---|---|---|
| JP | 2012044646 A | 3/2012 |
| JP | 2013-239796 A | 11/2013 |

* cited by examiner

MOVING AND STILL IMAGE METHOD, DEVICE, AND RECORDING MEDIUM

CROSS-REFERENCE TO RELATED APPLICATIONS

The present application is a Divisional of U.S. application Ser. No. 15/874,420 filed Jan. 18, 2018 which was a Divisional of U.S. application Ser. No. 15/150,452 filed May 10, 2016, and claims priority under 35 U.S.C. § 119 to Japanese Patent Application No. 2015-107009 filed May 27, 2015. The above application is hereby expressly incorporated by reference, in its entirety, into the present application.

BACKGROUND OF THE INVENTION

The present invention relates to an image processing device, an image processing method and a recording medium for extracting a frame image corresponding to a best shot from a moving image and outputting the frame image.

In recent years, many moving images are shot even by common families. A shot moving image may include a best shot showing a scene that is hard to seize by a device for taking still images (such as a shot properly showing a motion of a person shot for the moving image), for instance, the scene of a child blowing out candles on his/her birthday. On the other hand, moving images may include scenes with less movement of persons, low importance, poor composition, poor image quality, or other unfavorable properties.

It is therefore extremely troublesome to find a best shot in a moving image and extract a frame image corresponding to the best shot from the moving image.

Meanwhile, there has been used a school photography service that sends a photographer to a school to take still images of school events such as a sports day. In this service, shot still images are uploaded to a network so that parents can order photographic prints of the still images via the network. In this service, by, for example, in addition to taking still images, shooting moving images with fixed cameras or the like and extracting frame images corresponding to best shots from the moving images, it is possible to order photographic prints of the frame images as with still images.

In this case, there is a demand for extracting frame images corresponding to best shots from moving images with taking account of information on still images, for example, preferentially extracting frame images that show scenes still images do not show, from moving images.

Aside from that, when, for instance, only two brothers are shot as subjects for a moving image of a family, it is only necessary to track the two brothers in the shot moving image. However, in a moving image of a sports day, several tens of persons appear one after another. In this case, simply tracking all the persons in the moving image results in longer processing time, and tracking unrelated persons results in lower accuracy of extraction of frame images. To cope with it, there is a demand for properly extracting a frame image corresponding to a best shot even from a moving image showing many persons.

Aside from that, when a moving image is shot by a fixed camera or the like, the shooting period of time is to be long and this is disadvantageous in terms of processing time. To cope with it, there is a demand for extracting only necessary frame images from a moving image as efficiently and quickly as possible.

Now JP 2008-294513 A, JP 2010-93405 A and JP 2012-44646 A are mentioned as literatures related to the present invention.

JP 2008-294513 A relates to a video playback device for playing back a highlight scene of a moving image content. The literature describes that time information on a still image content which was taken simultaneously with shooting a moving image content is used in detecting a highlight scene of the moving image content.

JP 2010-93405 A relates to an information processor and the like for playing back a highlight scene of a moving image content. The literature describes that, based on the number of still image shooting devices that shot a highlight scene detection desired portion in a highlight scene of a moving image content, the importance of the highlight scene is controlled.

JP 2012-44646 A relates to an image processing device and the like for making a layout of a plurality of images. The literature describes extracting frame images from a moving image in accordance with the relationship between the moving image and still images and determining a layout of the still images and the frame images.

SUMMARY OF THE INVENTION

While JP 2012-44646 A describes extracting frame images from a moving image in accordance with the relationship between the moving image and still images as described above, none of JP 2008-294513 A, JP 2010-93405 A and JP 2012-44646 A mentions a method of extracting a frame image corresponding to a best shot from a moving image accurately, efficiently and rapidly.

An object of the present invention is to solve the problem of the related art and provide an image processing device, an image processing method and a recording medium that make it possible to extract a frame image corresponding to a best shot from a moving image accurately, efficiently and rapidly.

In order to achieve the above object, the present invention provides an image processing device including:

an image acquiring section configured to acquire a moving image and a plurality of still images;

a characteristic information extractor configured to extract, from the plurality of still images, at least a number of times a same subject appears in the plurality of still images, as characteristic information;

a target object detector configured to detect a subject which appears a number of times not less than a first threshold value, as a target subject;

an image analysis condition determiner configured to set an image analysis condition for a portion of the moving image where the target subject is absent to be rougher than the image analysis condition for a portion of the moving image where the target subject is present;

a frame image analyzer configured to extract frame images from the moving image and perform image analysis on the extracted frame images in accordance with the image analysis condition; and a frame image output section configured to calculate an evaluation value of each of the frame images based on a result of the image analysis and output, of the frame images, a frame image having an evaluation value not less than a second threshold value.

Also, the present invention provides an image processing method including:

a step of acquiring a moving image and a plurality of still images, with an image acquiring section;

a step of extracting, from the plurality of still images, at least a number of times a same subject appears in the plurality of still images, as characteristic information, with a characteristic information extractor;

a step of detecting a subject which appears a number of times not less than a first threshold value, as a target subject, with a target object detector;

a step of setting an image analysis condition for a portion of the moving image where the target subject is absent to be rougher than the image analysis condition for a portion of the moving image where the target subject is present, with an image analysis condition determiner;

a step of extracting frame images from the moving image and performing image analysis on the extracted frame images in accordance with the image analysis condition, with a frame image analyzer; and a step of calculating an evaluation value of each of the frame images based on a result of the image analysis and outputting, of the frame images, a frame image having an evaluation value not less than a second threshold value, with a frame image output section.

Also, the present invention provides a non-transitory computer readable recording medium having recorded thereon a program for causing a computer to execute each step of the image processing method according to above.

In the present invention, characteristic information is extracted from a plurality of still images; based on the characteristic information, an image analysis condition for a portion of a moving image which portion has low relevance with the still images is set to be rougher than that for a portion of the moving image which portion has high relevance with the still images; and frame images are extracted from the moving image and analyzed. According to the present invention, it is possible to extract a frame image corresponding to a best shot from a moving image accurately, efficiently and rapidly.

DETAILED DESCRIPTION OF THE INVENTION

An image processing device, an image processing method and a recording medium of the present invention are described below in detail with reference to preferred embodiments shown in the accompanying drawings.

Figure 1:
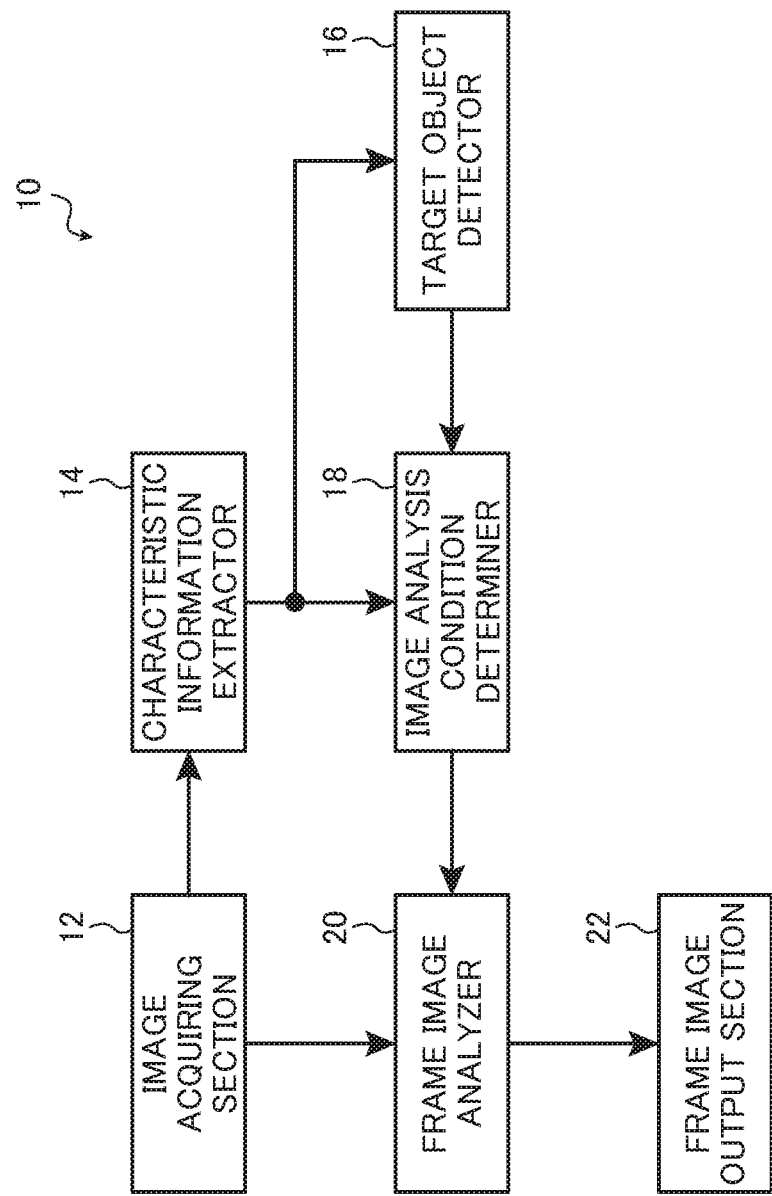
FIG. 1 is a block diagram showing an embodiment of the configuration of an image processing device of the invention.

FIG. 1 is a block diagram showing an embodiment of the configuration of an image processing device of the invention. An image processing device 10 shown in FIG. 1 extracts a frame image corresponding to a best shot from a moving image based on a plurality of still images and outputs the frame image. The image processing device 10 includes an image acquiring section 12, a characteristic information extractor 14, a target object detector 16, an image analysis condition determiner 18, a frame image analyzer 20 and a frame image output section 22.

The image acquiring section 12 acquires a moving image (moving image data) and a plurality of still images (still image data) to be subjected to the processing.

A moving image and a plurality of still images acquired together with the moving image are, for instance, ones showing the same school event as obtained through a school photography service. Such a moving image and still images are not limited to ones obtained through a school photography service and may be ones showing the same event or ones showing the same subject.

The characteristic information extractor 14 extracts, from a plurality of still images acquired by the image acquiring section 12, characteristic information representing the relevance with a moving image acquired together with the still images.

The characteristic information is not limited as long as it represents the relevance between a moving image and still images, and one example thereof is information on the number of times the same subject appears in a plurality of still images.

The target object detector 16 detects a target subject that is a subject to be a target object based on characteristic information extracted by the characteristic information extractor 14.

When the characteristic information is the number of times the same subject appears in a plurality of still images, the target object detector 16 detects a subject that appears many times (i.e., the number of times not less than a threshold value) as a target subject.

The term "subject" used herein refers to, in addition to a person, any of animals (e.g., dogs and cats), objects (e.g., dishes, flowers, Bonsai trees, rings and accessories) and scenes (e.g., a certain time range in which the same background is seen in a moving image, such as a night view, an evening view, an ocean view or a forest view, and a time range including the time at which an event, such as a relay race or a beanbag toss game in a sports day, was shot).

The image analysis condition determiner 18 sets an image analysis condition for a portion (non-important time range) of a moving image which portion has low relevance with a plurality of still images (i.e., has a relevance score lower than a threshold value) to be rougher than that for a portion (important time range) of the moving image which portion has high relevance with the still images (i.e., has a relevance score not lower than the threshold value) based on characteristic information extracted by the characteristic information extractor 14. The image analysis condition determiner 18 also changes the image analysis condition depending on whether a subject is a target subject detected by the target object detector 16.

When the characteristic information is the number of times the same subject appears in a plurality of still images, the image analysis condition determiner 18 sets an image analysis condition for a portion of a moving image where a target subject, which appears many times (i.e., the number of times not less than a threshold value), is absent to be rougher than that for a portion of the moving image where the target subject is present.

The image analysis condition is not limited as long as it is a condition applied in analyzing a moving image, namely frame images, and examples thereof include the frequency of extracting frame images from a moving image, the number of items of image analysis performed on a frame image, and the image size of a frame image in image analysis. A rough image analysis condition refers to a poorer (worse) condition compared to a dense image analysis condition, and examples thereof include such conditions as a reduced frequency of extracting frame images, a reduced number of items of image analysis performed on a frame image, and a reduced image size of a frame image in image analysis.

When the image analysis condition is the frequency of extracting frame images from a moving image, the image analysis condition determiner 18 sets the frequency of extracting frame images from a portion of a moving image where a target subject is absent to be less than that of extracting frame images from a portion of the moving image where the target subject is present.

When the image analysis condition is the number of items of image analysis performed on a frame image, the image analysis condition determiner 18 sets the number of items of image analysis performed on a frame image extracted from a portion of a moving image where a target subject is absent to be smaller than that of items of image analysis performed on frame images extracted from a portion of the moving image where the target subject is present.

For example, the number of items of image analysis performed on a frame image extracted from a portion of a moving image where a target subject is present is set to be two or more from among person detection, person's motion analysis, detection of a period of time during which a person is continuously present in a moving image, composition analysis, and image quality determination, the two or more including at least the person detection. On the other hand, the number of items of image analysis performed on a frame image extracted from a portion of a moving image where a target subject is absent is set to, while including the person detection, be smaller than the number of items of image analysis performed on a frame image extracted from a portion of the moving image where the target subject is present.

When the image analysis condition is the image size of a frame image in image analysis, the image analysis condition determiner 18 sets the image size, in image analysis, of a frame image extracted from a portion of a moving image where a target subject is absent to be smaller than the image size, in image analysis, of a frame image extracted from a portion of the moving image where the target subject is present.

For example, when the image size of a frame image extracted from a moving image is 800×600 pixels, the image size, in image analysis, of a frame image extracted from a portion of the moving image where a target subject is present is set to 800×600 pixels (no scale-down), whereas the image size, in image analysis, of a frame image extracted from a portion of the moving image where the target subject is absent is reduced to 400×300 pixels. For a frame image extracted from a portion of a moving image where a target subject is absent, it is only necessary to check whether the target subject is present and therefore, no problem arises even if the image size of the frame image in image analysis is reduced.

The image analysis condition determiner 18 can set one or simultaneously set two or more out of image analysis conditions including the frequency of extracting frame images, the number of items of image analysis, and the image size of a frame image in image analysis.

The frame image analyzer 20 extracts frame images from a moving image and performs the image analysis on the extracted frame images in accordance with an image analysis condition(s) determined by the image analysis condition determiner 18.

For instance, the frame image analyzer 20 extracts frame images from a moving image with the frequency of extraction in accordance with a determined image analysis condition, reduces the image size of frame images in accordance with a determined image analysis condition, and performs the image analysis by the number of items in accordance with a determined image analysis condition. The frame image analyzer 20 will be detailed later.

The frame image output section 22 calculates an evaluation value of each frame image extracted from a moving image based on a result of image analysis made by the frame image analyzer 20 and outputs, of a plurality of frame images extracted from the moving image, at least one frame image having a high evaluation value (i.e., an evaluation value not lower than a threshold value) as a frame image corresponding to a best shot.

Next, the frame image analyzer 20 is described in detail.

Figure 2:
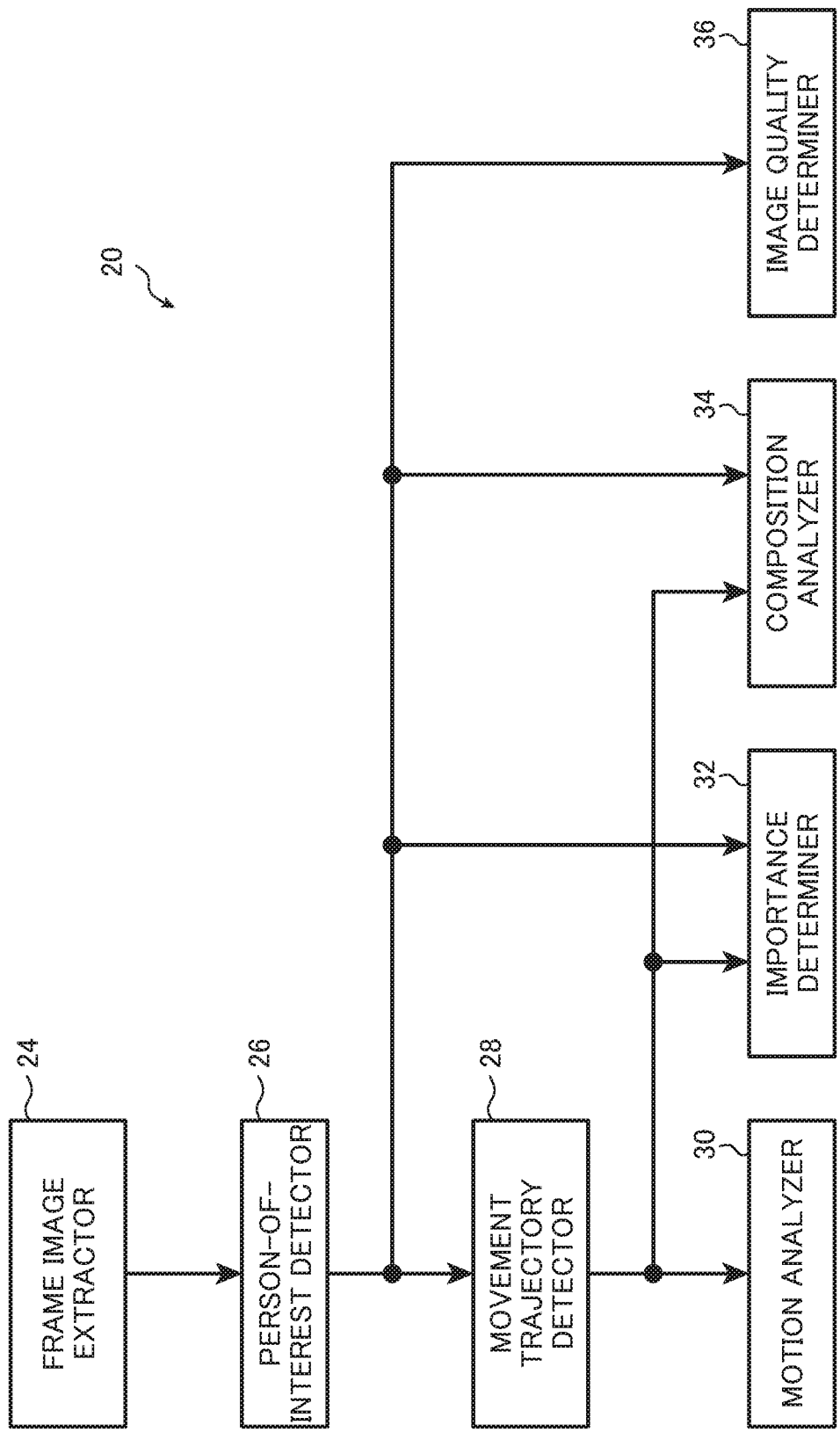
FIG. 2 is a block diagram showing an embodiment of the configuration of a frame image analyzer shown in FIG. 1.

FIG. 2 is a block diagram showing an embodiment of the configuration of the frame image analyzer shown in FIG. 1. The frame image analyzer 20 shown in FIG. 2 illustrates one exemplary configuration in the case where a frame image is output in which a target subject (e.g., target person) detected by the target object detector 16 is present. The frame image analyzer 20 includes a frame image extractor 24, a person-of-interest detector 26, a movement trajectory detector 28, a motion analyzer 30, an importance determiner 32, a composition analyzer 34 and an image quality determiner 36.

The frame image extractor 24 extracts a plurality of frame images from a moving image acquired by the image acquiring section 12 in accordance with an image analysis condition(s) determined by the image analysis condition determiner 18.

In the case of applying a dense image analysis condition, the frame image extractor 24 extracts, for instance, frame images of all frames of a moving image. The present invention is, however, not limited to this example, and the frame image extractor 24 may extract one frame image every predetermined number of frames, e.g., two frames. Alternatively, the frame image extractor 24 may extract frame images only from a given range of a moving image. In the case of applying a rough image analysis condition, the frame image extractor 24 extracts frame images from a moving image with less frequency of extraction compared to the case of applying a dense image analysis condition.

The person-of-interest detector 26 detects, in a plurality of frame images extracted from a moving image by the frame image extractor 24, a person identical or resembling a target person detected by the target object detector 16, as a person of interest.

For instance, the person-of-interest detector 26 detects whether a person is present in each frame image and compares an image of a detected person with an image of a target person detected by the target object detector 16 (e.g., compares face images) to thereby identify, from among detected persons, a person identical or resembling the target person (i.e., a person having a similarity score not lower than a threshold value) as a person of interest.

In addition, the person-of-interest detector 26 can detect the position, size and region of a person of interest, the region of the upper body of a person-of-interest, the position, size, region and direction of the face of a person of interest, and the like, in frame images.

Methods of detecting a person, a person's face and other elements in frame images are known and will not be described in detail. Specific details of such detecting methods are not limited in any way. A method of detecting a person of interest is also not limited.

The movement trajectory detector 28 detects a movement trajectory of a person of interest by tracking the movement of the person of interest in a moving image based on results of person-of-interest detection done by the person-of-interest detector 26 with a plurality of frame images. By detecting a movement trajectory of a person of interest, the movement trajectory detector 28 can also detect the length of movement trajectory of the person of interest, a moving pattern of the person-of-interest, a period of time during which the person of interest is continuously present in a moving image.

Figure 3A:
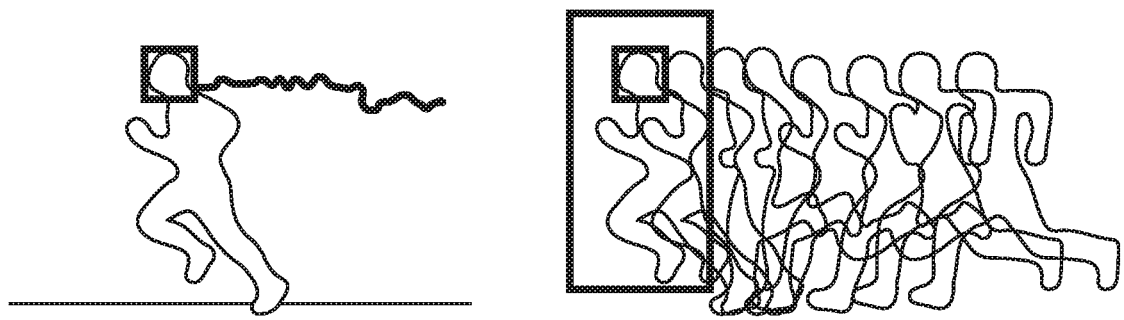
FIGS. 3A, 3B and 3C include, to the left, conceptual diagrams each showing an exemplary movement trajectory of a person of interest and, to the right, conceptual diagrams each showing an exemplary action history image of the person of interest.
Figure 3B:
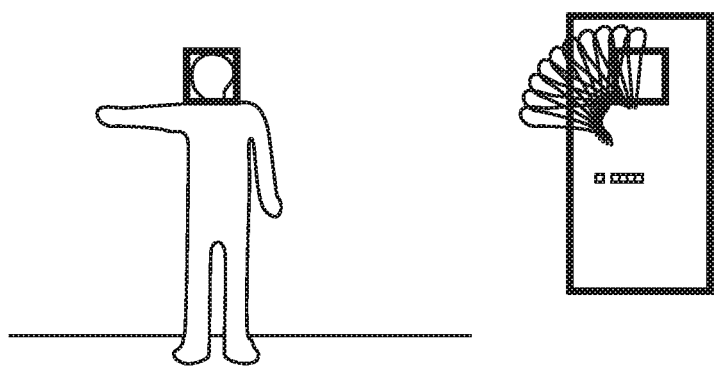
Figure 3C:
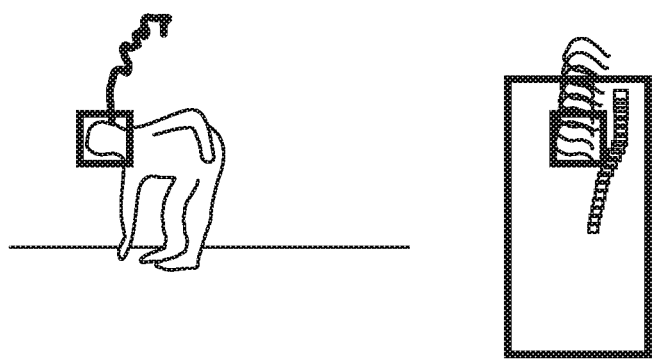

For a movement trajectory of a person of interest, use may be made of an image of a trajectory in the form of line resulting from the movement of a region of interest (ROI), e.g., a face region of a person of interest as shown to the left of any of FIGS. 3A to 3C. Alternatively, for a movement trajectory of a person of interest, a motion history image (MHI) may be used as shown to the right of any of FIGS. 3A to 3C. The motion history image shows the history of motion of a person of interest with the color changing at certain time intervals. The use of such a motion history image makes it possible to know, for instance, the position, size, moving portion and moving direction of a person of interest.

The movement trajectory detector 28 can track the movement of a person of interest in a moving image by, for instance, with the use of a face region of the person of interest, comparing the face region of the person of interest in a frame image of a present frame with a detecting region at a given position corresponding to the face region of the person of interest in a frame image of the next frame, and based on the position of the detecting region in the frame image of the next frame in which position the similarity score with respect to the face region of the person of interest in the frame image of the present frame is not lower than a threshold value, detecting a position of the detecting region in the frame image of the next frame to which position the face region of the person of interest in the frame image of the present frame has moved.

Only with the detection of a face region of a person of interest, a difficulty may arise in tracking the movement of the person of interest because the position, size and the like of the person of interest changes with time in frame images. To cope with it, the upper body of a person of interest is divided into a certain number of regions, e.g., four regions, and the movement of the person of interest is tracked separately for the four regions in addition to the face region, that is, five regions in total. Thus, the success rate of tracking can be improved.

When the similarity is determined between a face region of a person of interest in a frame image of a present frame and a detecting region in a frame image of the next frame, in order to detect, in the frame image of the next frame, a detecting region at a position corresponding to the face region of the person of interest in the frame image of the present frame, the calculation of the sum of brightness values of all pixels within a detecting region at a given position has to be repeated for respective detecting regions at plural positions in sequence. Accordingly, an enormous amount of calculation is required to calculate the sum of brightness values for every frame.

In this case, the amount of calculation can be reduced by producing an integral image of a frame image of the next frame (i.e., each frame) and calculating the sum of brightness values using the produced integral image, thereby speeding up the processing. Assuming that pixel coordinates of a frame image increases from left to right and top to bottom, the integral image is an image in which a pixel at each set of coordinates has an integral value of brightness values from the pixel at the upper left corner through each pixel at each set of coordinates.

Methods of calculating the sum of brightness values of all pixels within a region corresponding to a face region of a person of interest are known and therefore will not be described in detail. Besides, when the movement of a person of interest is tracked, the use of an integral image is not essential in reducing the amount of calculation and speeding up the processing, and various methods such as mean shift are applicable. Mean shift is also known and the details thereof are not given.

The motion analyzer 30 analyzes the motion of a person of interest in a moving image based on a movement trajectory of the person of interest, e.g., a region of interest such as a face region, detected by the movement trajectory detector 28.

The motion analyzer 30 defines movement trajectories of a person of interest beforehand, such as a movement trajectory of the person of interest when he/she is running, detects, from a movement trajectory of the person of interest detected by the movement trajectory detector 28, a portion similar to any of the movement trajectories defined beforehand, and analyzes the motion of the person of interest.

The motion analyzer 30 can also use such motion history images as shown to the right of FIGS. 3A to 3C as movement trajectories of a person of interest in analyzing the motion of the person of interest.

Through analysis of the motion of the person of interest based on the motion history images, the motion analyzer 30 can recognize that, for example, the person of interest is running from right to left in FIG. 3A as shown to the right of FIG. 3A, the person of interest stands still and moves only his/her right hand as shown to the right of FIG. 3B, and the person of interest is picking up something on the ground as shown to the right of FIG. 3C.

The importance determiner 32 determines the importance of each frame image based on at least one of the length of movement trajectory of a person of interest, the position of the person of interest in a frame image, and the size of the person of interest in a frame image.

For example, when a movement trajectory of a person of interest is long (i.e., longer than a threshold value), this makes it possible to estimate that a shooting person has a strong interest in the person of interest. Accordingly, the importance determiner 32 determines that the importance of frame images corresponding to the long movement trajectory of the person of interest is high in the moving image. The importance determiner 32 also determines that the importance of a frame image in which a person of interest is positioned in the center of the frame or large (i.e., larger than a threshold value) in the frame is high.

The composition analyzer 34 analyzes the composition of each frame image to determine whether the composition is good based on at least one of the position of a person of interest in a frame image, the size of the person of interest in a frame image, and a moving pattern of the person of interest.

The composition analyzer 34 determines that, for instance, the composition of a frame image in which a person of interest is positioned in the center of the frame or large (i.e., larger than a threshold value) in the frame is better than that of a frame image in which the person of interest is not positioned in the center of the frame or is not large in the frame.

The composition analyzer 34 defines moving patterns of a person of interest beforehand, such as a moving pattern of the person of interest when he/she moves from the left end to the right end in a moving image, and detects, from a movement trajectory of the person of interest detected by the movement trajectory detector 28, a portion where the person of interest moves in any of the defined moving patterns. The composition analyzer 34 determines that the composition of frame images corresponding to the portion where the person of interest moves in any of the defined moving patterns is good.

The image quality determiner 36 determines the image quality of each frame image using a region, e.g., a region of interest such as a face region of a person of interest in a frame image.

Frame images extracted from a moving image may be good or bad in image quality depending on compression method of the moving image. In addition, frame images may be blur due to poor focusing, camera shake or another reason, or may be improper in terms of, for instance, brightness, hue or contrast. Even when, however, the image quality is poor in a background portion, if the image quality is good in a region of interest, namely a face or body region of a person of interest, the image quality analyzer 36 determines that the image quality of the frame image is good.

Whether the image analyses by the person-of-interest detector 26, the movement trajectory detector 28, the motion analyzer 30, the importance determiner 32, the composition analyzer 34 and the image quality determiner 36 are performed is determined in accordance with the image analysis condition determined by the image analysis condition determiner 18. In the case of applying a dense image analysis condition, all of the image analyses above are performed. In the case of applying a rough image analysis condition, a smaller number of image analyses are performed compared to the case of applying the dense image analysis condition. For instance, the image analyses by the movement trajectory detector 28 and the motion analyzer 30 are not performed.

The frame image output section 22 calculates evaluation values of each frame image based on a result of the image analysis by the motion analyzer 30 or results of the image analyses by the motion analyzer 30, the importance determiner 32, the composition analyzer 34 and the image quality determiner 36 and outputs, of frame images extracted from a moving image by the frame image extractor 24, a frame image having a high evaluation value (i.e., an evaluation value not lower than a threshold value) as a frame image corresponding to a best shot.

In other words, the frame image output section 22 calculates an evaluation value of each frame image from the aspect of the motion of a person of interest based on the motion of the person of interest in a moving image analyzed by the motion analyzer 30. For example, the frame image output section 22 can calculate an evaluation value for the motion of a person of interest depending on the type of the motion of the person of interest in such a manner that specified points are given as the evaluation value when the motion of the person of interest is run.

In addition, the frame image output section 22 calculates an evaluation value for the motion of a person of interest analyzed by the motion analyzer 30 based on such a motion history image as shown to the right of any of FIGS. 3A to 3C, which is regarded as a movement trajectory of the person of interest. For example, the frame image output section 22 can calculate an evaluation value for the motion of a person of interest based on results of determination as to whether, where and in which direction the person is moving.

In addition, the frame image output section 22 calculates an importance evaluation value of each frame image based on the importance of each frame image determined by the importance determiner 32. For example, the frame image output section 22 can calculate an importance evaluation value in such a manner that the evaluation value increases with higher importance.

In addition, the frame image output section 22 calculates a composition evaluation value of each frame image based on a result of determination made by the composition analyzer 34 as to whether the composition of each frame image is good. For example, the frame image output section 22 can calculate a composition evaluation value in such a manner that the evaluation value of a frame image with the composition determined to be good is higher than that of a frame image with the composition determined to be not good.

In addition, the frame image output section 22 calculates an image quality evaluation value of each frame image based on the image quality of each frame image determined by the image quality determiner 36. For example, the frame image output section 22 can calculate an image quality evaluation value in such a manner that, for frame images determined to have good image quality, the evaluation value increases with better image quality. For example, the degree of blur in a region of interest is determined, and the image quality evaluation value is calculated in such a manner that the evaluation value decreases with a higher degree of blur.

The frame image output section 22 outputs, of a plurality of frame images extracted from a moving image by the frame image extractor 24, at least one frame image having an evaluation value for the motion of a person of interest or a total evaluation value obtained by adding at least one of importance, composition and image quality evaluation values to an evaluation value for the motion of a person of interest being not lower than a threshold value, as a frame image corresponding to a best shot.

Figure 4:
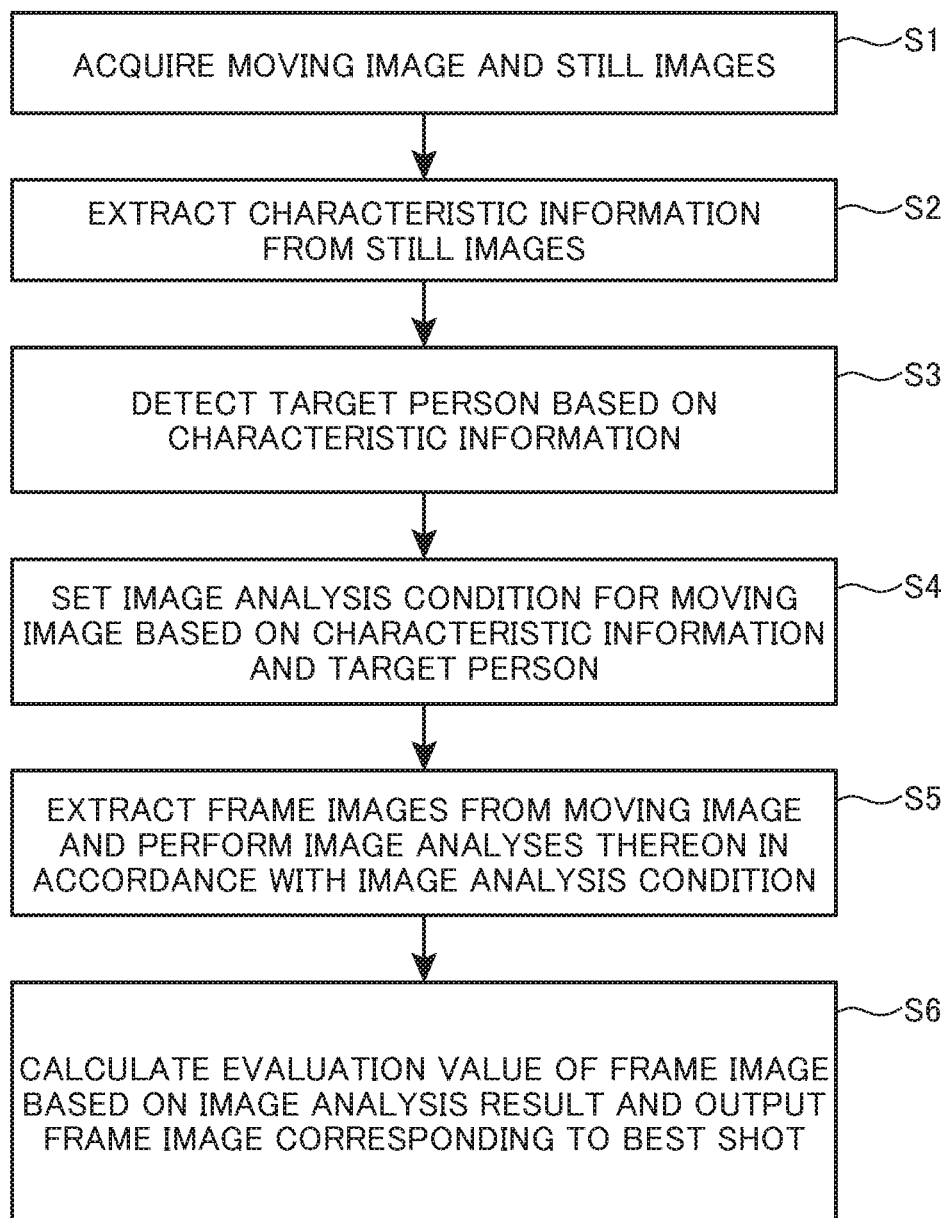
FIG. 4 is a flowchart showing an example of the operation of the image processing device.

Next, the operation of the image processing device 10 shown in FIG. 1 is described with reference to the flowchart of FIG. 4.

In the image processing device 10, first, the image acquiring section 12 acquires a moving image and a plurality of still images to be subjected to the processing (Step S1).

The characteristic information extractor 14 extracts, from the still images, the number of times the same person appears, as characteristic information (Step S2).

Based on the characteristic information, the target object detector 16 detects, for instance, a person who appears many times, as a target person (Step S3).

Based on the characteristic information and the target person, the image analysis condition determiner 18 sets an image analysis condition for a portion of the moving image which portion has low relevance with the still images to be rougher than that for a portion of the moving image which portion has high relevance with the still images (Step S4).

For instance, the frequency of extracting frame images from a portion of the moving image where a person of interest, who appears many times, is absent is set to be less than that of extracting frame images from a portion of the moving image where the person of interest is present.

Subsequently, the frame image analyzer 20 extracts frame images from the moving image and performs the image analysis on the extracted frame images in accordance with the image analysis condition (Step S5). The operation of the frame image analyzer 20 will be detailed later.

Based on a result of the image analysis, the frame image output section 22 calculates an evaluation value of each frame image and outputs, of the frame images extracted from the moving image, a frame image having a high evaluation value as a frame image corresponding to a best shot (Step S6).

In the image processing device 10, characteristic information is extracted from still images; based on the characteristic information, an image analysis condition for a portion of a moving image where a person of interest, who appears many times, is absent is set to be rougher than that for a portion of the moving image where the person of interest is present; and frame images are extracted from the moving image and analyzed. This configuration makes it possible to extract a frame image corresponding to a best shot from a moving image accurately, efficiently and rapidly.

Figure 5:
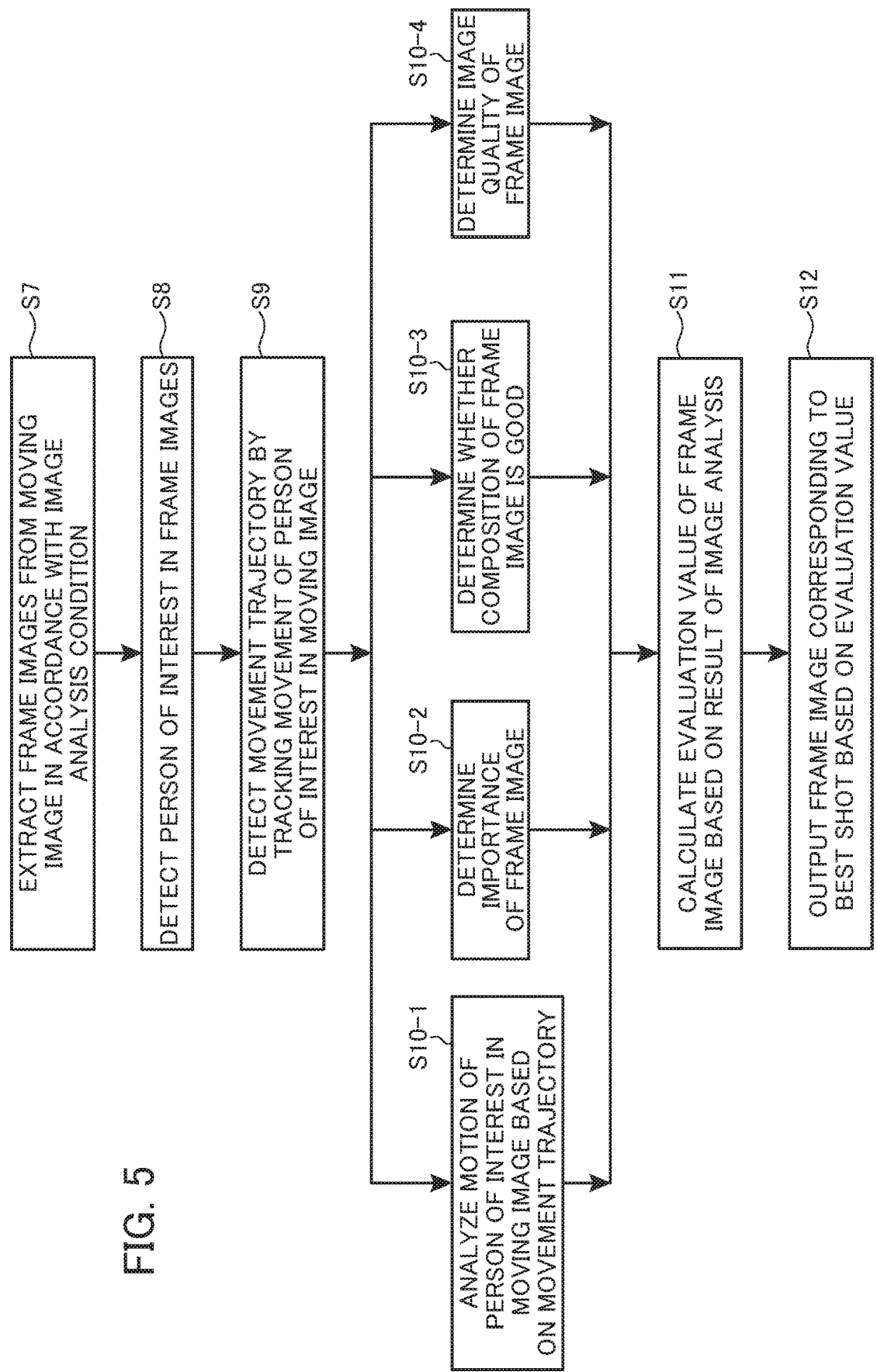
FIG. 5 is a flowchart showing an example of the operation of the frame image analyzer.

Next, the operation of the frame image analyzer 20 is described with reference to the flowchart shown in FIG. 5.

In the frame image analyzer 20, first, the frame image extractor 24 extracts frame images from the moving image in accordance with the image analysis condition (Step S7). In this step, for instance, frame images are extracted from a portion of the moving image where a person of interest is absent with less extraction frequency than that in the case of extracting frame images from a portion of the moving image where the person of interest is present.

The person-of-interest detector 26 detects, in the frame images extracted by the frame image extractor 24, a person (person of interest) identical or resembling the target person detected by the target object detector 16 (Step S8). In this step, the person of interest is identified in each frame image, while the position, size, region and the like of the person of interest in each frame image are detected.

Based on the results of person-of-interest detection with the frame images, the movement trajectory detector 28 detects a movement trajectory of the person of interest by, for instance, tracking the movement of a region of interest of the person of interest in the moving image (Step S9). In this step, as the movement trajectory of the person of interest, for instance, there can be obtained an image of a trajectory in the form of line resulting from the movement of a region of interest such as a face region as shown to the left of any of FIGS. 3A to 3C or a motion history image as shown to the right of any of FIGS. 3A to 3C.

Based on the movement trajectory of the person of interest detected by the movement trajectory detector 28, the motion analyzer 30 analyzes the motion of the person of interest in the moving image (Step S10-1).

Based on the length of the movement trajectory of the person of interest and the position and size of the person of interest in each frame image, the importance determiner 32 determines the importance of each frame image (Step S10-2).

Based on the position and size of the person of interest in each frame image and the moving pattern of the person of interest, the composition analyzer 34 determines whether the composition of each frame image is good (Step S10-3)

The image quality determiner 36 determines the image quality of each frame image using a region of the person of interest in each frame image (Step S10-4).

The order of determining evaluation values for the motion of the person of interest, the importance, the composition and the image quality is not limited, and the evaluation values may be calculated in any order. Alternatively, those evaluation values may be calculated in parallel, i.e., simultaneously.

Whether the image analyses by the person-of-interest detector 26, the movement trajectory detector 28, the motion analyzer 30, the importance determiner 32, the composition analyzer 34 and the image quality determiner 36 are performed is determined in accordance with the image analysis condition. For instance, the number of items of image analysis performed on frame images extracted from a portion of the moving image where the person of interest, who appears many times, is absent is set to be smaller than that of items of image analysis performed on frame images extracted from a portion of the moving image where the person of interest is present.

Subsequently, based on a result of the image analysis by the motion analyzer 30 or results of the image analyses by the motion analyzer 30, the importance determiner 32, the composition analyzer 34 and the image quality determiner 36, the frame image output section 22 calculates an evaluation value of each frame image (Step S11). In other words, an evaluation value for the motion of the person of interest or evaluation values for the motion of the person of interest, the importance, the composition and the image quality are calculated for each frame image.

Finally, of the frame images extracted from the moving image by the frame image extractor 24, at least one frame image having a high evaluation value for the motion of the person of interest or having a total evaluation value (sum of evaluation values) obtained by adding evaluation values for the motion of the person of interest, the importance, the composition and the image quality being high, is output as a frame image corresponding to a best shot (Step S12).

As described above, in the image processing device 10, based on an evaluation value for the motion of a person of interest in a moving image or a total evaluation value including an evaluation value for the motion of the person of interest in the moving image and evaluation values for the importance, the composition and the image quality of frame images, a best shot can be automatically detected in the moving image, and a frame image corresponding to the best shot can be extracted from among frame images extracted from the moving image.

When two or more persons of interest are present, the person-of-interest detector 26 can detect each of the two or more persons of interest in a plurality of frame images and sequentially determine who the detected two or more persons of interest are. In this case, the movement trajectory detector 28, the motion analyzer 30, the importance determiner 32, the composition analyzer 34, the image quality determiner 36 and the frame image output section 22 sequentially perform their processing on each of the two or more persons of interest.

The above description applies also when the target subject, which is a target object, is an animal or an object. However, the description of the detection of a person of interest, the detection of a movement trajectory and the motion analysis applies only when the target subject is a living body such as a person or an animal.

As described above, the image processing device 10 can detect, as a person of interest, a person who appears many times in a plurality of still images that were acquired together with a moving image and extract a frame image in which the person of interest is present from the moving image.

For instance, when a plurality of still images associated with each class of a school (e.g., a group photograph of each class, photographs showing various combinations of close friends belonging to the same class) are, together with a moving image, input to the image processing device 10, frame images showing a child or children of each class are mainly extracted on a class basis. When a plurality of still images showing a child or children of a parent(s) are, together with a moving image, input to the image processing device 10, frame images showing the child or children of the parent(s) are mainly extracted.

Figure 6A:
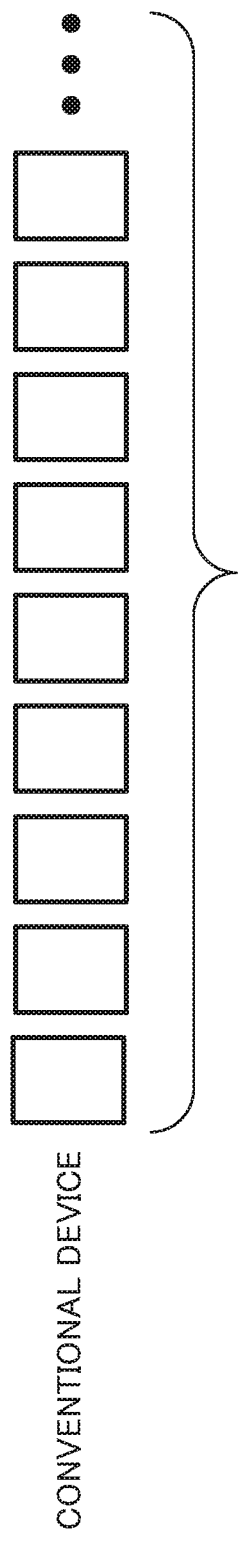
FIG. 6A is a conceptual diagram showing an exemplary method of extracting frame images from a moving image by means of a conventional image processing device.

In extracting frame images in which a person of interest is present from a moving image, a conventional image processing device extracts all frame images of frames from the start of the moving image and performs various image analyses on every frame image, as shown in FIG. 6A. In FIG. 6A, frame images of solid line represent extracted ones. Accordingly, such a conventional image processing device requires a long period of time for extraction of frame images from a moving image and following image analyses and is thus incapable of rapidly extracting a frame image corresponding to a best shot from a moving image.

Figure 6B:
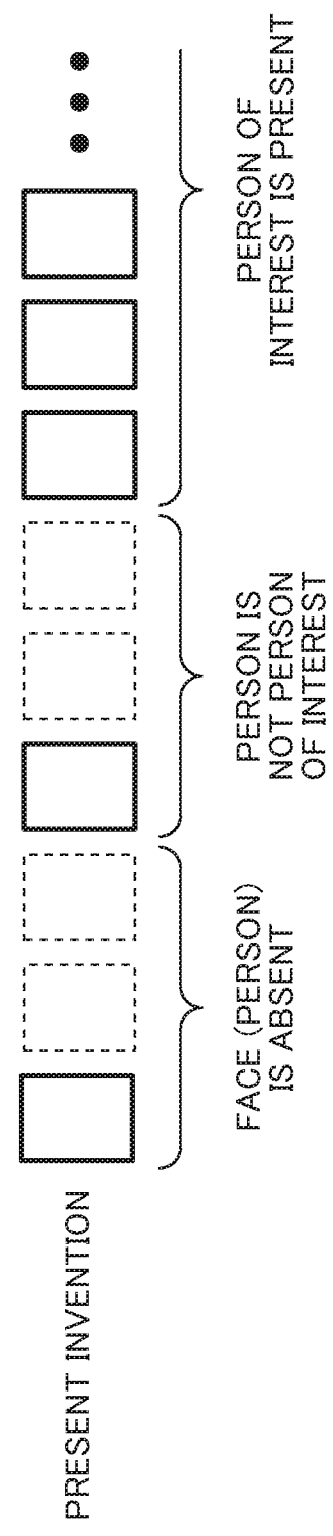
FIG. 6B is a conceptual diagram showing an exemplary method of extracting frame images from a moving image by means of the image processing device of the invention.

In the image processing device 10, the frequency of extracting frame images from a portion of a moving image where a person of interest is absent is set to be less than that of extracting frame images from a portion of the moving image where the person of interest is present. As shown in FIG. 6B, when a face (person) is not detected or when a detected face (person) is not a person of interest, one frame image is extracted per thirty frames from a moving image, for example. In FIG. 6B, frame images of solid line represent extracted ones and frame images of dashed line represent unextracted ones. When a person of interest is present, one frame image is extracted per frame from a moving image.

Since the frequency of extracting frame images from a portion of a moving image where a person of interest is absent is set to be less than that of extracting frame images from a portion of the moving image where the person of interest is present, only a frame image to be output as one corresponding to a best shot can be extracted from a moving image in a short period of time and subjected to the image analysis. Accordingly, a frame image corresponding to a best shot can be extracted from a moving image accurately, efficiently and rapidly.

A frame image extracted from a portion of a moving image where a person of interest is absent is not output as one corresponding to a best shot and therefore, no problem arises even if the frequency of extracting frame images is reduced in the portion of the moving image where the person of interest is absent.

While the case of detecting a face (person) has been described in the foregoing, the invention is not limited thereto and the detection of an animal, such as a pet, an object, or a scene may be used to extract a frame image corresponding to a best shot and output the extracted frame image.

The image analysis condition determiner 18 may change the frequency of extracting frame images from a moving image depending on the type of the subject (person, animal, object, scene or the like).

For example, when at least one living thing of a person and an animal is present, it is desirable to increase the frequency of extracting frame images from a portion of a moving image where the living thing is present in order to detect a movement trajectory. In contrast, when a living thing is absent and a non-living thing such as an object is present, a movement trajectory is not detected and therefore, no problem arises even if the frequency of extracting frame images from a portion of a moving image where a living thing is absent is set to be less than that of extracting frame images from a portion of the moving image where a living thing is present.

The image analysis condition determiner 18 may change the frequency of extracting frame images from a moving image depending on the contents of frame images.

For instance, when the size of a face is large, this means that the face was shot at close range and the subject's movement is probably large. Therefore, when a frame image is extracted from a portion of a moving image where at least one living thing of a person and an animal is present and appears in a large size (i.e., a size larger than a threshold value), it is desirable to, for instance, extract a frame image per frame or increase the frequency of extracting frame images. On the other hand, when the size of a face is small, this means that the face was shot at long range and the subject's movement is probably small. Therefore, when a frame image is extracted from a portion of a moving image where a living thing appearing in a large size (i.e., a size larger than a threshold value) is absent, even if the frequency of extracting frame images is set to be less than that of extracting frame images from a portion of the moving image where a living thing appearing in a large size is present, no problem arises.

As characteristic information, the shooting time of each still image can be used. In this case, it is not necessary to output a frame image shot in the same time range as a time range which overlaps the time a still image was shot, as a frame image corresponding to a best shot. In response to this, the image analysis condition determiner 18 may set an image analysis condition for a portion of a moving image which portion was shot within a shooting time range covering certain periods of time before and after the shooting time of a still image, to be rougher than that for a portion of the moving image which portion was shot within a shooting time range other than the shooting time range covering certain periods of time before and after the shooting time of the still image.

When, for instance, the image analysis condition is the frequency of extracting frame images, the image analysis condition determiner 18 sets the frequency of extracting frame images from a portion of a moving image which portion was shot within a shooting time range covering certain periods of time before and after the shooting time of a still image, to be less than that of extracting frame images from a portion of the moving image which portion was shot within a shooting time range other than the shooting time range covering certain periods of time before and after the shooting time of the still image.

When the image analysis condition is the number of items of image analysis, the image analysis condition determiner 18 sets the number of items of image analysis performed on frame images extracted from a portion of a moving image which portion was shot within a shooting time range covering certain periods of time before and after the shooting time of a still image, to be smaller than that of items of image analysis performed on frame images extracted from a portion of the moving image which portion was shot within a shooting time range other than the shooting time range covering certain periods of time before and after the shooting time of the still image.

For example, the number of items of image analysis performed on frame images extracted from a portion of a moving image which portion was shot within a shooting time range other than a shooting time range covering certain periods of time before and after the shooting time of a still image, is set to two or more selected from among person detection, person's motion analysis, detection of a period of time during which a person is continuously present in a moving image, composition analysis, and image quality determination. On the other hand, the number of items of image analysis performed on frame images extracted from a portion of the moving image which portion was shot within the shooting time range covering certain periods of time before and after the shooting time of the still image, is set to be smaller than the number of items of image analysis performed on frame images extracted from the portion of the moving image where the target subject is present.

When the image analysis condition is the image size of a frame image in image analysis, the image analysis condition determiner 18 sets the image size, in image analysis, of a frame image extracted from a portion of a moving image which portion was shot within a shooting time range covering certain periods of time before and after the shooting time of a still image, to be smaller than the image size, in image analysis, of a frame image extracted from a portion of the moving image which portion was shot within a shooting time range other than the shooting time range covering certain periods of time before and after the shooting time of the still image.

For example, when the image size of a frame image extracted from a moving image is 800×600 pixels, the image size, in image analysis, of a frame image extracted from a portion of the moving image which portion was shot within a shooting time range other than a shooting time range covering certain periods of time before and after the shooting time of a still image is set to 800×600 pixels (no scale-down), whereas the image size, in image analysis, of a frame image extracted from a portion of the moving image which portion was shot within the shooting time range covering certain periods of time before and after the shooting time of the still image is reduced to 400×300 pixels. An important image must have been shot as a still image, and it is necessary to extract only a frame image having a remarkably high evaluation value from a portion of a moving image which portion was shot within a shooting time range covering certain periods of time before and after the shooting time of a still image. Therefore, no problem arises even if the image size of the frame image in image analysis is reduced.

The image analysis condition determiner 18 may simultaneously set one or more out of image analysis conditions including the frequency of extracting frame images, the number of items of image analysis, and the image size of a frame image in image analysis, to be rough.

When the image acquiring section 12 acquires a plurality of moving images, the image analysis condition determiner 18 may set an image analysis condition so as not to allow the extraction of any frame image from, of the acquired moving images, a moving image shot within a shooting time range including the shooting time of a still image.

For example, when the shooting time range of a moving image A starts at 10:12:20 and ends at 10:14:09, the shooting time range of a moving image B starts at 10:23:55 and ends at 10:27:10, and the shooting time of a still image is 10:24:30, no frame image is extracted from the moving image B.

The image analysis condition determiner 18 may set an image analysis condition so as not to allow the extraction of any frame image from a portion of a moving image which portion was shot within a shooting time range covering certain periods of time before and after the shooting time of a still image, for instance, a shooting time range covering thirty seconds before and thirty seconds after the shooting time of the still image.

Thus, in the image processing device 10 in this embodiment, it is possible to partially omit the processing for some moving images out of a plurality of moving images or a part of a moving image over a certain time range. Therefore, the processing speed can be improved.

Instead of determining a range of a moving image from which range frame images are extracted, the image analysis condition determiner 18 may set the frequency of extracting frame images from a portion of a moving image which portion was shot within a shooting time range covering certain periods of time before and after the shooting time of a still image, to be less than that of extracting frame images from a portion of the moving image which portion was shot within a shooting time range other than the shooting time range covering certain periods of time before and after the shooting time of the still image.

For instance, one frame image is extracted per thirty frames from a portion of a moving image which portion was shot within a shooting time range covering certain periods of time before and after the shooting time of a still image, while one frame image is extracted per frame from a portion of the moving image which portion was shot within a shooting time range other than the shooting time range above.

The image analysis condition determiner 18 may set the number of items of image analysis performed on frame images extracted from a portion of a moving image which portion was shot within a shooting time range covering certain periods of time before and after the shooting time of a still image, to be smaller than that of items of image analysis performed on frame images extracted from a portion of the moving image which portion was shot within a shooting time range other than the shooting time range covering certain periods of time before and after the shooting time of the still image.

For example, for frame images extracted from a portion of a moving image which portion was shot within a shooting time range covering certain periods of time before and after the shooting time of a still image, the detection of a movement trajectory and the motion analysis are performed but the detection of a person of interest is not performed. For frame images extracted from a portion of a moving image which portion was shot within a shooting time range other than the shooting time range above, in addition to the detection of a movement trajectory and the motion analysis, the detection of a person of interest is also performed.

However, when, for example, a frame image having a high importance evaluation value exists within a shooting time range covering certain periods of time before and after the shooting time of a still image, one frame image may be extracted per frame from a portion of a moving image which portion corresponds to several frames present before and after the frame image having a high importance evaluation value.

When, for instance, a beanbag toss game in a sports day was shot for both a moving image and still images and there is a still image shot at the same time as the shooting time of a frame image extracted from the moving image, it is pointless to use the frame image extracted from the moving image. Therefore, the frame image output section 22 preferably sets an evaluation value for a frame image having been shot within the same time range as a time range during which, of a plurality of still images, at least one still image was shot, to be lower than that for a frame image having been shot within a time range different from (not same as) the time range during which the still image was shot, as shown in Table 1. The same time range herein may refer to a shooting time range, for example, covering thirty seconds before and thirty seconds after the shooting time of a still image, or a time range corresponding to the same scene.

TABLE 1

| Evaluation value only based on moving image | Shooting time of still image is taken into account | |
|---|---|---|
| | Same time range as that of still image | Different time range from that of still image |
| A | B | A |
| B | C | B |
| C | D | C |
| D | D | D |

Table 1 illustrates a method of determining evaluation values of four frame images. The evaluation values of the four frame images only based on the associated moving image are A, B, C and D. The evaluation is the highest at A, decreases in the order of B, C and D, and is the lowest at D. Taking account of the shooting time of a still image, when the frame images were shot within the same time range as a time range during which the still image was shot, the evaluation values of the four frame images are decremented by one degree, that is, to B, C, D and D. When the four frame images were shot within a time range different from the time range during which the still image was shot, their evaluation values are unchanged and remain at A, B, C and D.

Alternatively, the frame image output section 22 may set an evaluation value for a frame image that was shot within the same time range as a time range during which, of a plurality of still images, at least one still image was shot and that was shot at the same shooting time as that of the still image (i.e., a frame image shot within a shooting time range covering certain periods of time before and after the shooting time of the still image), to be lower than that for a frame image that was not shot in the same time range and at the same shooting time (i.e., a frame image shot within a shooting time range other than the shooting time range covering certain periods of time before and after the shooting time of the still image). The frame image that was shot at the same shooting time herein may refer to a frame image shot during, compared to the foregoing time range, a shorter time range covering certain periods of time (e.g., three seconds) before and after the shooting time of a still image.

TABLE 2

| Evaluation value only based on moving image | Shooting time of still image is taken into account | | |
|---|---|---|---|
| | Same time range as that of still image | | Different time range from that of still image |
| | There is still image of same shooting time | There is no still image of same shooting time | |
| A | D | B | A |
| B | D | C | B |
| C | D | D | C |
| D | D | D | D |

In Table 2, the evaluation values of four frame images only based on the associated moving image are A, B, C and D as with the above case. Taking account of the shooting time of a still image, when the four frame images were shot within the same time range as a time range during which the still image was shot and also shot at the same shooting time as that of the still image, the evaluation values of all the images are decremented to the lowest level, that is, D. When the four frame images were shot within the same time range as the time range during which the still image was shot but not shot at the same shooting time as that of the still image, the evaluation values of the images are decremented by one degree, that is, to B, C, D and D. When the four frame images were shot within a time range different from the time range during which the still image was shot, their evaluation values are unchanged and remain at A, B, C and D.

Alternatively, taking account of the shooting positions and shooting directions of still images and frame images, when a frame image that was shot within the same time range as a time range during which a still image was shot and that was also shot at the same shooting time as that of the still image is different from the still image in at least one of the shooting position and direction, the frame image output section 22 may retain or even raise the evaluation value for the frame image shot within the same time range and also at the same shooting time.

Thus, by taking account of shooting times of still images, it is possible to remove a time range with low importance in advance. In the actual processing, upon determination of the importance, frame images in an important time range are output as files so that the frame images can be reused later. Since the present embodiment is configured to take account of shooting times of still images and remove in advance frame images in a non-important time range, frame images to be output as files can be narrowed down, which results in reduced processing time in outputting such frame images as files.

For information on shooting times of still images and shooting positions and directions of still images and frame images, use may be made of information included in exchangeable image file format (EXIF) information attached to the still images and the frame images as header information.

When the same subject appears a few times (i.e., the number of times less than a threshold value) in a plurality of still images, the frame image output section 22 may reduce a threshold value for use in determining whether a frame image is output as one corresponding to a best shot, to a smaller value than a threshold value used in the case where the same subject appears many times (i.e., the number of times not less than the threshold value).

In this case, for instance, frame images showing a person who appears a few times in a plurality of still images are output as frame images corresponding to best shots, more than frame images showing a person who appears many times in the still images. This can prevent the number of frame images showing a person who appears not many times from being too small, so that the total number of still and frame images showing each of shot persons can be uniform.

As characteristic information, information on a result of person recognition for each still image can be used. In this case, the image analysis condition determiner 18 may set an image analysis condition in such a manner to allow the extraction of a frame image showing a person corresponding to information on a person recognition result, from a moving image.

As characteristic information, information on a result of scene determination or object recognition for each still image can be used. In this case, the image analysis condition determiner 18 may set an image analysis condition in such a manner to allow the extraction of a frame image showing a scene corresponding to information on a scene determination result or a frame image showing an object corresponding to information on an object recognition result, from a moving image.

To be more specific, when a still image showing "autumn leaves" is input, frame images with "autumn leaves" scenes are extracted from a moving image using scene determination. When a still image showing a "child's hand" is input, frame images with "child's hand" scenes are extracted from a moving image using object recognition.

As characteristic information, information on person's movement in each still image can be used. In this case, the image analysis condition determiner 18 may set an image analysis condition in such a manner to allow the extraction of a frame image in which a person exhibiting movement corresponding to information on person's movement is present, from a moving image.

To be more specific, when a still image showing a "jumping child" is input, frame images with "jumping child" scenes are extracted from a moving image using the movement of a person in the moving image.

When a moving image and a plurality of still images are simultaneously shot by a single shooting device, the shooting times of the moving and still images are identical; however, when a moving image and a plurality of still images are shot by different shooting devices, there may be a difference between the shooting times of the moving and still images. In the present invention, a moving image and a plurality of still images may be shot by a single shooting device or two or more shooting devices, and in the case of shooting moving and still images by two or more shooting devices, it is preferable to synchronize the shooting times of the moving and still images before the image analysis is performed on frame images.

The device of the present invention may be composed of constituent elements that are dedicated hardware devices or composed of a computer in which operations of the constituent elements are programmed.

The method of the present invention can be carried out by, for instance, a program that causes a computer to implement steps of the method. A computer readable recording medium having the program recorded thereon may also be provided.

While the present invention has been described above in detail, the invention is not limited to the above embodiment, and various improvements and modifications may be made without departing from the spirit and scope of the invention.

What is claimed is:

1. An image processing device comprising a processor, wherein the processor:

acquires a moving image and a plurality of still images which are shot individually separately from the moving image;

extracts characteristic information from the plurality of still images;

sets a first image evaluation condition for one portion of the moving image relating to the characteristic information to be lower than a second image evaluation condition for another portion of the moving image based on the characteristic information;

evaluates frame images included in the one portion of the moving image in accordance with the first image evaluation condition, and evaluates frame images included in the another portion of the moving image in accordance with the second image evaluation condition; and outputs, of frame images included in the moving image, a frame image having an evaluation value not less than a first threshold value, and wherein the processor sets an evaluation value for a frame image having been shot at a time that is included in a same time range as a time range including a shooting time when at least one still image which is included in the plurality of still images was shot, to be lower than an evaluation value for a frame image having been shot at a time that is not included in the same time range.

2. The image processing device according to claim 1, wherein the one portion of the moving image has a relevance score with the plurality of still images not lower than a second threshold value and the another portion of the moving image has a relevance score with the plurality of still images lower than the second threshold value.

3. The image processing device according to claim 1, wherein a time range, including a shooting time when at least one still image included in the plurality of still images was shot as the characteristic information, is extracted from the plurality of still images, and the first image evaluation condition for the frame images included in one portion of the moving image having been shot at a time included in the time range relating to the characteristic information is set to be lower than the second image evaluation condition for the frame images included in another portion of the moving image based on the characteristic information.

4. The image processing device according to claim 3, wherein the time range is a time range including all shooting times of the plurality of still images.

5. The image processing device according to claim 3, wherein the processor sets an evaluation value for a frame image having been shot at a time included in a same time range as the time range, to be lower than an evaluation value for a frame image having been shot at a time that is not included in the same time range.

6. The image processing device according to claim 3, wherein the processor sets an evaluation value for a frame image having been shot at a same time as a shooting time of at least one still image which is included in the plurality of still images, to be lower than an evaluation value for a frame image having been shot at a time that is different from the shooting time, and is included in the time range.

7. The image processing device according to claim 3, wherein the one portion of the moving image has a relevance score with the plurality of still images not lower than a second threshold value and the another portion of the moving image has a relevance score with the plurality of still images lower than the second threshold value.

8. An image processing device comprising a processor, wherein the processor:
    acquires a moving image and a plurality of still images which are shot individually separately from the moving image;
    extracts characteristic information from the plurality of still images;
    sets a first image evaluation condition for one portion of the moving image relating to the characteristic information to be lower than a second image evaluation condition for another portion of the moving image based on the characteristic information;
    evaluates frame images included in the one portion of the moving image in accordance with the first image evaluation condition, and evaluates frame images included in the another portion of the moving image in accordance with the second image evaluation condition; and
    outputs, of frame images included in the moving image, a frame image having an evaluation value not less than a first threshold value, and
    wherein the processor sets an evaluation value for a frame image having been shot at a same time as a shooting time when at least one still image that is included in the plurality of still images was shot, to be lower than an evaluation value for a frame image having been shot at a time that is not the shooting time, and is included in a time range including the shooting time.

9. An image processing method comprising:
    acquiring a moving image and a plurality of still images which are shot individually separately from the moving image, with an image acquiring section;
    extracting characteristic information from the plurality of still images, with a characteristic information extractor;
    setting a first image evaluation condition for one portion of the moving image relating to the characteristic information to be lower than a second image evaluation condition for another portion of the moving image based on the characteristic information, with an image evaluation condition determiner;
    evaluating frame images included in the one portion of the moving image in accordance with the first image evaluation condition, and evaluating frame images included in the another portion of the moving image in accordance with the second image evaluation condition, with a frame image evaluation section; and
    outputting, of frame images included in the moving image, a frame image having an evaluation value not less than a first threshold value, with a frame image output section, and
    wherein the processor sets an evaluation value for a frame image having been shot at a time that is included in a same time range as a time range including a shooting time when at least one still image which is included in the plurality of still images was shot, to be lower than an evaluation value for a frame image having been shot at a time that is not included in the same time range.

10. The image processing method according to claim 9, wherein
    the one portion of the moving image has a relevance score with the plurality of still images not lower than a second threshold value and the another portion of the moving image has a relevance score with the plurality of still images lower than the second threshold value.

11. The image processing method according to claim 9, wherein
    the extracting step extracts a time range, including a shooting time when at least one still image included in the plurality of still images was shot as the characteristic information from the plurality of still images, with the characteristic information extractor, and
    the setting step sets the first image evaluation condition for the frame images included in one portion of the moving image having been shot at a time included in the time range relating to the characteristic information to be lower than the second image evaluation condition for the frame images included in another portion of the moving image based on the characteristic information, with the image evaluation condition determiner.

12. The image processing method according to claim 11, wherein
    the one portion of the moving image has a relevance score with the plurality of still images not lower than a second threshold value and the another portion of the moving image has a relevance score with the plurality of still images lower than the second threshold value.

13. An image processing method comprising:
    acquiring a moving image and a plurality of still images which are shot individually separately from the moving image, with an image acquiring section;
    extracting characteristic information from the plurality of still images, with a characteristic information extractor;
    setting a first image evaluation condition for one portion of the moving image relating to the characteristic information to be lower than a second image evaluation condition for another portion of the moving image based on the characteristic information, with an image evaluation condition determiner;
    evaluating frame images included in the one portion of the moving image in accordance with the first image evaluation condition, and evaluating frame images included in the another portion of the moving image in accordance with the second image evaluation condition, with a frame image evaluation section; and
    outputting, of frame images included in the moving image, a frame image having an evaluation value not less than a first threshold value, with a frame image output section, and
    wherein the processor sets an evaluation value for a frame image having been shot at a same time as a shooting time when at least one still image that is included in the plurality of still images was shot, to be lower than an evaluation value for a frame image having been shot at a time that is not the shooting time, and is included in a time range including the shooting time.

14. A non-transitory computer readable recording medium having recorded thereon a program for causing a computer to execute each step of the image processing method according to claim 9.

* * * * *